US010955309B2

(12) United States Patent
Suzuki et al.

(10) Patent No.: US 10,955,309 B2
(45) Date of Patent: Mar. 23, 2021

(54) TORQUE SENSOR (71) Applicant: NIDEC COPAL ELECTRONICS CORPORATION, Tokyo (JP)

(72) Inventors: Takashi Suzuki, Sano (JP); Takao Ikeda, Sano (JP); Takayuki Endo, Sano (JP)

(73) Assignee: NIDEC COPAL ELECTRONICS CORPORATION, Tokyo (JP)

(*) Notice: Subject to any disclaimer, the term of this patent is extended or adjusted under 35 U.S.C. 154(b) by 43 days.

(21) Appl. No.: 16/451,839

(22) Filed: Jun. 25, 2019

(65) Prior Publication Data
US 2019/0346329 A1 Nov. 14, 2019

Related U.S. Application Data (63) Continuation of application No. PCT/JP2017/042906, filed on Nov. 29, 2017.

(30) Foreign Application Priority Data

Feb. 13, 2017 (JP) .............................. JP2017-023885

(51) Int. Cl.
*G01L 25/00* (2006.01)
*B25J 13/08* (2006.01)
(Continued)

(52) U.S. Cl.
CPC ........... *G01L 25/003* (2013.01); *B25J 13/085* (2013.01); *G01L 3/108* (2013.01); *G01L 5/0042* (2013.01); *G01L 5/0071* (2013.01)

(58) Field of Classification Search
CPC ..... G01L 25/003; G01L 3/108; G01L 5/0042; G01L 5/0071; G01L 3/10; B25J 13/085
See application file for complete search history.

(56) References Cited

U.S. PATENT DOCUMENTS 3,915,015 A * 10/1975 Crane .................... B43K 29/08
73/865.4
2017/0205296 A1 * 7/2017 Bradford ................ B25J 13/085

FOREIGN PATENT DOCUMENTS

CN 1914493 2/2007
CN 101365609 2/2009
(Continued)

OTHER PUBLICATIONS

International Search Report for International Application PCT/JP2017/042906, dated Dec. 26, 2017.
(Continued)

*Primary Examiner* — Herbert K Roberts
*Assistant Examiner* — John M Royston
(74) *Attorney, Agent, or Firm* — Burris Law, PLLC (57) ABSTRACT

The torque sensor of the present embodiments comprises a first structure to be coupled to an object to be measured, a second structure, a first bridge circuit including a plurality of first strain sensors configured to detect force to be transmitted between the first structure and the second structure, a second bridge circuit including a plurality of second strain sensors configured to detect force to be transmitted between the first structure and the second structure, and a controller configured to output a signal indicating an abnormality when a difference between a first output voltage of the first bridge circuit and a second output voltage of the second bridge circuit is greater than a first threshold voltage.

12 Claims, 4 Drawing Sheets

(51) Int. Cl.
   *G01L 3/10*          (2006.01)
   *G01L 5/00*          (2006.01)

(56)             References Cited

FOREIGN PATENT DOCUMENTS

| CN | 102812341      | 12/2012 |
|----|----------------|---------|
| CN | 203164326      | 8/2013  |
| JP | 07239283 A  *  | 9/1995  |
| JP | 2000111428     | 4/2000  |
| JP | 3444952        | 9/2003  |
| JP | 2005249772     | 9/2005  |
| JP | 2013011567 A * | 1/2013  |
| JP | 2013096735     | 5/2013  |
| JP | 5640905        | 12/2014 |
| JP | 2015049209     | 3/2015  |
| JP | 5947494        | 7/2016  |

OTHER PUBLICATIONS

Office Action issued in corresponding CN Application No. 201780080958.8, dated Aug. 3, 2020.

* cited by examiner

TORQUE SENSOR

CROSS-REFERENCE TO RELATED APPLICATIONS

This application is a continuation of International Application No. PCT/JP2017/042906, filed on Nov. 29, 2017, which claims priority to and the benefit of Japanese Patent Application No. 2017-023885, filed Feb. 13, 2017. The disclosures of the above applications are incorporated herein by reference.

FIELD

The present disclosure relates to a torque sensor provided to, for example, a joint of a robot arm.

BACKGROUND

The statements in this section merely provide background information related to the present disclosure and may not constitute prior art.

For example, in a production line, a plurality of robot arms is provided and these robot arms cooperate to assemble the products. Each joint of these robot arms is provided with a torque sensor (see, for example, Patent Literature 1 (JP 2013-096735 A), Patent Literature 2 (JP 2015-049209 A), and Patent Literature 3 (JP 5640905 B)).

SUMMARY

Heretofore, it has been difficult for a torque sensor attached to a robot arm to detect an abnormality of the torque sensor itself or abnormality of the arm. For this reason, even in a case where in, for example, a collaborative robot in which a plurality of robot arms cooperate with each other, an abnormality of the torque sensor itself or abnormality of the arm occurs due to some cause, it has been difficult to avoid a collision between robot arms. Accordingly, a torque sensor having a so-called fail-safe function which makes it possible to detect in advance an abnormality of the torque sensor itself is desired.

Embodiments of the present invention provide a torque sensor capable of detecting an abnormality of the torque sensor itself and having a fail-safe function.

The torque sensor of the present embodiments comprises a first structure to be coupled to an object to be measured; a second structure; a first bridge circuit including a plurality of first strain sensors configured to detect force to be transmitted between the first structure and the second structure; a second bridge circuit including a plurality of second strain sensors configured to detect force to be transmitted between the first structure and the second structure; and a controller configured to output a signal indicating an abnormality when a difference between a first output voltage of the first bridge circuit and a second output voltage of the second bridge circuit is greater than a first threshold voltage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinafter, embodiments will be described with reference to the accompanying drawings. In the drawings, the same parts are denoted by the same reference numerals.

First Embodiment

Figure 1:
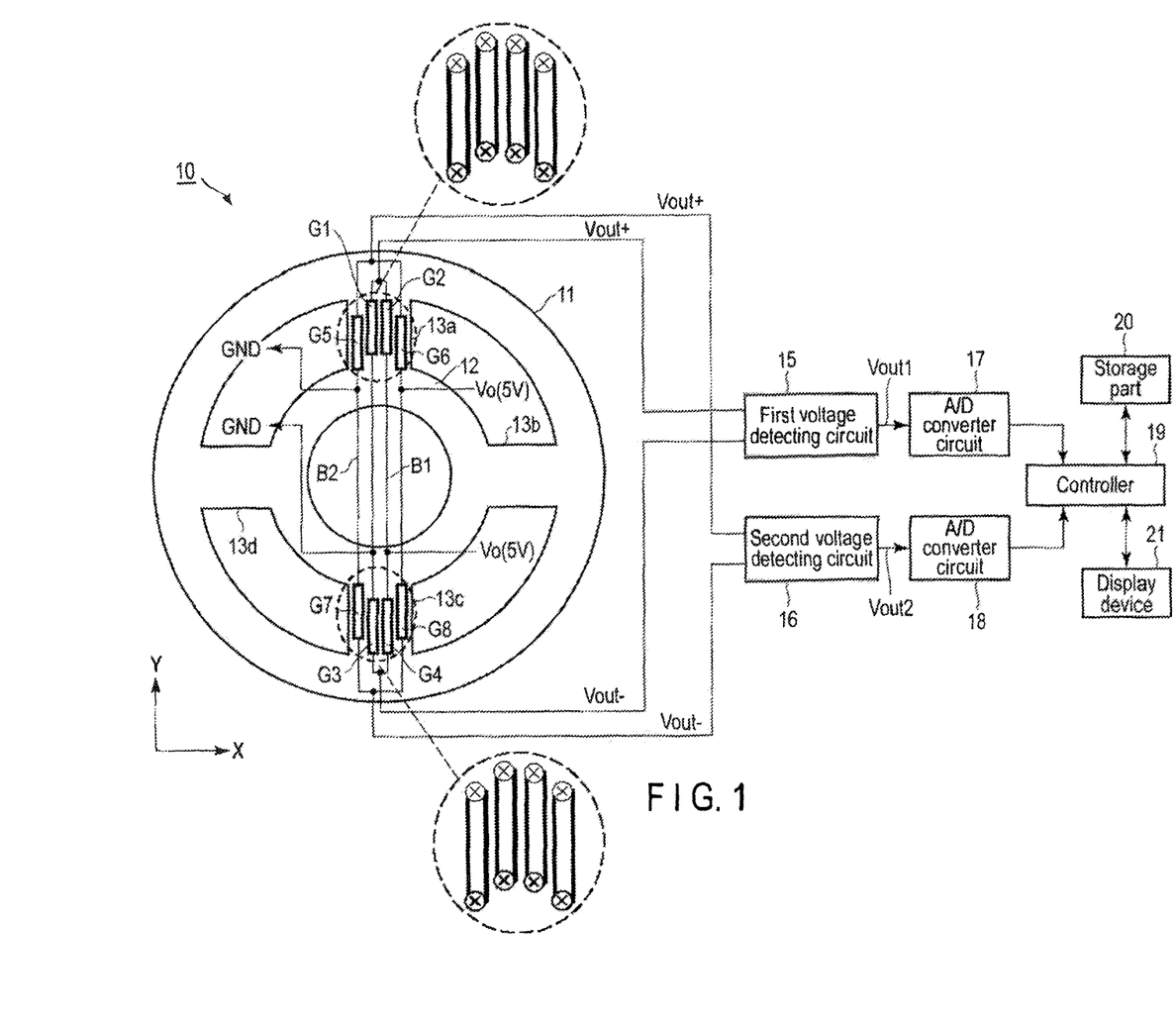
FIG. 1 is a block diagram showing an example of a torque sensor according to a first embodiment.

In FIG. 1, a torque sensor 10 comprises, for example, a first structure 11, second structure 12, a plurality of third structures 13 serving as beam parts, first bridge circuit B1, and second bridge circuit B2.

The first structure 11 and second structure 12 have, for example, annular shapes and, the second structure 12 and first structure 11 constitute concentric circles. A plurality of third structures 13a, 13b, 13c, and 13d couples the first structure 11 and second structure 12 to each other. In the first embodiment, the third structures 13a, 13b, 13c, and 13d function as, for example, strain-inducing parts.

The first structure 11 is attached to, for example, one of joints of a robot arm (not shown), the one of joints being an object to be measured. More specifically, the first structure 11 is attached to, for example, a speed reducer (not shown) and, the speed reducer is coupled to a motor (not shown). The second structure 12 is attached to, for example, the other of the joints of the robot arm (not shown).

The third structures 13a, 13b, 13c, and 13d transmit force (torque) between the first structure 11 and the second structure 12.

The first structure 11, second structure 12, and third structures 13a, 13b, 13c, and 13d are constituted of, for example, a metal. However, if a mechanical strength sufficient for the torque to be applied can be obtained, it is also possible to form the first structure 11, second structure 12, and third structures 13a, 13b, 13c, and 13d of a material other than the metal.

Of the third structures 13a, 13b, 13c, and 13d, the third structures 13a and 13c which are arranged at positions 180° apart from each other are provided with the first bridge circuit B1 and second bridge circuit B2.

The first bridge circuit B1 is constituted of first to fourth strain sensors (strain gages) G1 to G4, and second bridge circuit B2 is constituted of fifth to eighth strain sensors G5 to G8.

The first strain sensor G1 and second strain sensor G2 of the first bridge circuit B1, and fifth strain sensor G5 and sixth strain sensor G6 of the second bridge circuit B2 are provided on the third structure 13a and, third strain sensor G3 and fourth strain sensor G4 of the first bridge circuit B1, and seventh strain sensor G7 and eighth strain sensor G8 of the second bridge circuit B2 are provided on the third structure 13c.

Each of the first to eighth strain sensors G1 to G8 is constituted of, for example, a thin-film resistive element provided on, for example, a metallic plate (not shown) through an insulating film. However, the configuration of each of the first to eighth strain sensors G1 to G8 is not limited to this.

The metallic plate of each of the first to eighth strain sensors G1 to G8 is fixed to the surface of the third structure 13a or third structure 13c by means of, for example, adhesive bonding, screwing, welding or the like.

Further, although the first strain sensor G1, second strain sensor G2, fifth strain sensor G5 and sixth strain sensor G6 are provided on the third structure 13a, and third strain sensor G3, fourth strain sensor G4, seventh strain sensor G7, and eighth strain sensor G8 are provided on the third structure 13c, the arrangement of the strain sensors is not limited to this.

For example, the metallic plate provided in each of the first to eighth strain sensors G1 to G8 may also be used as a strain body. In this case, the metallic plates of the first strain sensor G1, second strain sensor G2, fifth strain sensor G5, and sixth strain sensor G6 may be provided between the first structure 11 and second structure 12 at positions other than the third structures 13a, 13b, 13c, and 13d, and metallic plates of the third strain sensor G3, fourth strain sensor G4, seventh strain sensor G7, and eighth strain sensor G8 may be provided between the first structure 11 and second structure 12. The metallic plate of each strain sensor may be fixed to the first structure 11 or second structure 12 by means of, for example, adhesive bonding, screwing, welding or the like.

In the first bridge circuit B1, the first strain sensor G1 and third strain sensor G3 are connected in series, and second strain sensor G2 and fourth strain sensor G4 are also connected in series. The first strain sensor G1 and third strain sensor G3 connected in series are connected in parallel with the second strain sensor G2 and fourth strain sensor G4 connected in series.

A power-supply voltage Vo, for example, 5 V is supplied to a connection node between the second strain sensor G2 and fourth strain sensor G4, and connection node between the first strain sensor G1 and third strain sensor G3 is grounded.

In the second bridge circuit B2, the fifth strain sensor G5 and seventh strain sensor G7 are connected in series, and sixth strain sensor G6 and eighth strain sensor G8 are also connected in series. The fifth strain sensor G5 and seventh strain sensor G7 connected in series are connected in parallel with the sixth strain sensor G6 and eighth strain sensor G8 connected in series.

A power-supply voltage Vo, for example, 5 V is supplied to a connection node between the sixth strain sensor G6 and eighth strain sensor G8, and connection node between the fifth strain sensor G5 and seventh strain sensor G7 is grounded.

In the first bridge circuit B1, a connection node between the first strain sensor G1 and second strain sensor G2 is connected to a first input terminal of a first voltage detecting circuit 15, and connection node between the third strain sensor G3 and fourth strain sensor G4 is connected to a second input terminal of the first voltage detecting circuit 15.

In the second bridge circuit B2, a connection node between the fifth strain sensor G5 and sixth strain sensor G6 is connected to a first input terminal of a second voltage detecting circuit 16, and connection node between the seventh strain sensor G7 and eighth strain sensor G8 is connected to a second input terminal of the second voltage detecting circuit 16.

The first voltage detecting circuit 15 detects an output voltage of the first bridge circuit B1, and second voltage detecting circuit 16 detects an output voltage of the second bridge circuit B2. Each of the first voltage detecting circuit 15 and second voltage detecting circuit 16 is constituted of, for example, voltage-dividing resistors and operational amplifier. However, the configuration of each of the first and second voltage detecting circuits 15 and 16 is not limited to this.

The principle of operation of the first voltage detecting circuit 15 is as follows.

For example, when torque (in the clockwise direction or counterclockwise direction of the first structure 11 and second structure 12) is applied to the torque sensor 10, in the first bridge circuit B1, an output voltage Vout+ is output from the connection point between the first strain sensor G1 and second strain sensor G2, and output voltage Vout− is output from the connection point between the third strain sensor G3 and fourth strain sensor G4. From the output voltage Vout+ and output voltage Vout−, an output voltage Vout1 of the first bridge circuit B1 indicated by a formula (1) is obtained.

$$Vout1 = (Vout+ - Vout-) = (R1/(R1+R2) - R3/(R3+R4)) \cdot Vo \quad (1)$$

where
R1 is the resistance value of the first strain sensor G1,
R2 is the resistance value of the second strain sensor G2,
R3 is the resistance value of the third strain sensor G3,
R4 is the resistance value of the fourth strain sensor G4,
and
R1=R2=R3=R4=R is obtained in a state where no torque is applied to the torque sensor 10.

On the other hand, when force other than torque, for example, thrust force (force to be applied to the first structure 11 and second structure 12 shown in FIG. 1 in the horizontal direction (X direction) or in the vertical direction (Y direction)) is applied to the torque sensor 10, changes in the resistance values of the first strain sensor G1, second strain sensor G2, third strain sensor G3, and fourth strain sensor G4 (R1=R−ΔR, R2=R+ΔR, R3=R−ΔR, R4=R+ΔR, where ΔR is a value of a change in the resistance value) cancel each other, and the output voltage Vout1 of the first bridge circuit B1 becomes 0 V.

The principle of operation of the second voltage detecting circuit 16 corresponding to the second bridge circuit B2 is identical to the first voltage detecting circuit 15. An output voltage Vout2 of the second voltage detecting circuit 16 is also obtained in the same manner as the first voltage detecting circuit 15.

The output voltage Vout1 of the first voltage detecting circuit 15 is supplied to an analog-to-digital (A/D) converter circuit 17, and is converted into a digital signal and, output voltage Vout2 of the second voltage detecting circuit 16 is supplied to an A/D converter circuit 18, and is converted into a digital signal. Output signals of the A/D converter circuit 17 and A/D converter circuit 18 (hereinafter referred to also as output signals of the first bridge circuit B1 and second bridge circuit B2) are supplied to, for example, a controller 19 periodically. The controller 19 supplies one or both of the output signals of the A/D converter circuit 17 and A/D converter circuit 18 to an external device as an output signal or output signals of the torque sensor 10 or detects an abnormality of the torque sensor 10 to be described later.

Further, the controller 19 is provided with a storage part 20 capable of storing therein the output signals of the A/D converter circuit 17 and A/D converter circuit 18 for, for example, a fixed period. The output signals of the A/D converter circuit 17 and A/D converter circuit 18 stored in the storage part 20 are updated, for example, every fixed periods.

Furthermore, to the controller 19, for example, a display device 21 is connected. The display device 21 displays a detection output signal of the torque sensor 10 and signal or the like indicating that an abnormality of the torque sensor 10 has been detected.

Operation

Figure 2:
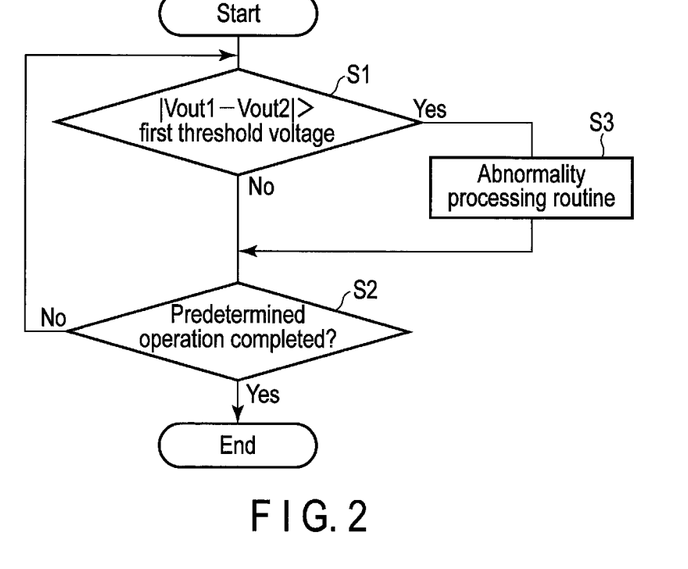
FIG. 2 is a flowchart shown for explaining an operation of FIG. 1.
Figure 3:
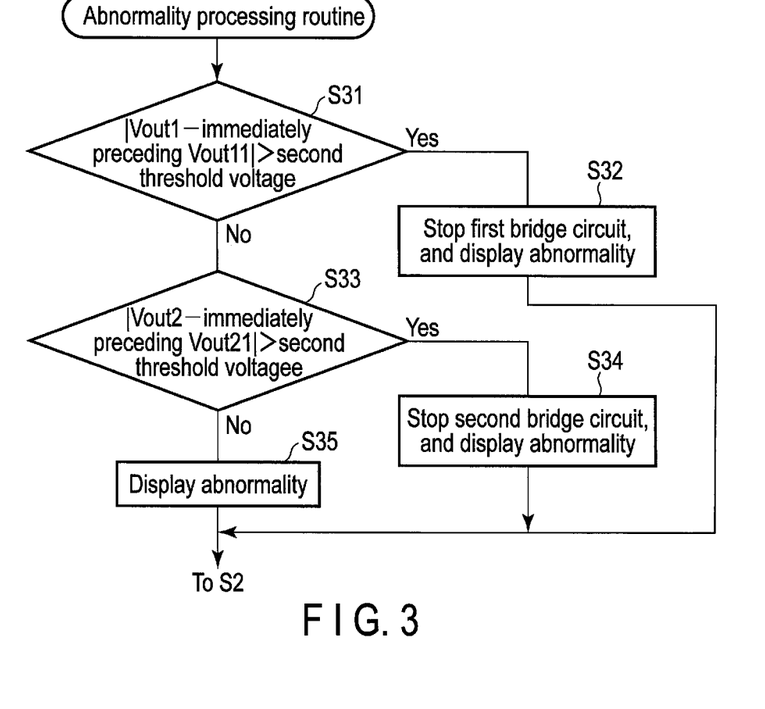
FIG. 3 is a flowchart shown for explaining an operation subsequent to FIG. 2.

FIG. 2 and FIG. 3 are flowcharts for explaining the operation of the controller 19.

In normal times, in the torque sensor 10, both the first bridge circuit B1 and second bridge circuit B2 simultaneously operate, and the output voltages of the first bridge circuit B1 and second bridge circuit B2 are compared with each other. That is, the controller 19 obtains an absolute value of a difference between the output voltage Vout1 of the first bridge circuit B1 supplied thereto from the first voltage detecting circuit 15 through the A/D converter circuit 17 and output voltage Vout2 of the second bridge circuit B2 supplied thereto from the second voltage detecting circuit 16 through the A/D converter circuit 18, and compares the absolute value of the difference with a first threshold voltage (S1). It should be noted that the absolute value is not indispensable, and it is sufficient if the difference between both the output voltages can be obtained.

When the absolute value of the difference is less than the first threshold voltage as a result of the above comparison (S1, NO), it is determined that both the first bridge circuit B1 and second bridge circuit B2 normally operate. The controller 19 determines whether or not a predetermined operation of the torque sensor 10 has been completed on the basis the output voltage of, for example, one of the first bridge circuit B1 and second bridge circuit B2 (S2). The predetermined operation implies, as described previously, an operation of, for example, supplying the output signal of the torque sensor 10 to the external device, detecting an abnormality of the torque sensor 10 or the like. When the predetermined operation has not been completed yet as a result of this determination (S2, NO), the control is moved to S1. Further, when the predetermined operation has already been completed (S2, YES), the control is terminated.

On the other hand, when it is determined in S1 that the absolute value of the difference is greater than the first threshold voltage (S1, YES), the control is moved to an abnormality processing routine S3. That is, that the absolute value of the difference is greater than the first threshold voltage implies that an abnormality has occurred in one of the first bridge circuit B1 and second bridge circuit B2. Accordingly, in the abnormality processing routine S3, it is determined in which of the first bridge circuit B1 and second bridge circuit B2 the abnormality has occurred.

FIG. 3 shows an example of the abnormality processing routine S3.

First, the controller 19 obtains an absolute value of a difference between the output voltage Vout1 of the first bridge circuit B1 and last output voltage Vout11 of the first bridge circuit B1 stored in the storage part 20, and determines whether or not this absolute value is greater than a second threshold voltage (S31). The second threshold voltage may be equal to the first threshold voltage or may be less than or equal to the first threshold voltage.

When the absolute value of the difference is greater than the second threshold voltage as a result of this determination (S31, YES), it is determined that the first bridge circuit B1 is abnormal, and power supply to, for example, the first bridge circuit B1 is stopped. Concomitantly with this, a signal indicating an abnormality is supplied to the display device 21, and it is displayed on the display device 21 that the first bridge circuit B1 is abnormal (S32). After this, the control is moved to, for example, S2, and the predetermined operation is executed by using the normal second bridge circuit B2.

On the other hand, when the absolute value is less than or equal to the second threshold voltage, it is determined that the first bridge circuit B1 is normal (S31, NO), the controller 19 obtains an absolute value of a difference between the output voltage Vout2 of the second bridge circuit B2 and last output voltage Vout21 of the second bridge circuit B2 stored in the storage part 20, and determines whether or not this absolute value of the difference is greater than the second threshold voltage (S33).

As a result of this determination, when the absolute value of the difference is greater than the second threshold voltage (S33, YES), it is determined that the second bridge circuit B2 is abnormal, and power supply to, for example, the second bridge circuit B2 is stopped. Concomitantly with this, a signal indicating an abnormality is supplied to the display device 21, and it is displayed on the display device 21 that the second bridge circuit B2 is abnormal (S34). After this, the control is moved to, for example, S2, and the predetermined operation is executed by using the normal first bridge circuit B1.

Further, when it is determined in S33 that the absolute value of the difference is less than or equal to the second threshold voltage (S33, NO), it is determined that an abnormality has not been detected in neither of the first bridge circuit B1 and second bridge circuit B2 in the determination of this time. When such a result is brought about, it is conceivable as a cause that an abnormality or the like may have occurred in something other than the torque sensor 10. Accordingly, when it is determined in S33 that the absolute value is less than or equal to the second threshold voltage (S33, NO), it is displayed on the display device 21, for example, that an abnormality has occurred (S35). After this, the control is moved to S2.

As described above, when an abnormality is detected in one of the first bridge circuit B1 and second bridge circuit B2 in the abnormality processing routine S3, one of the first bridge circuit B1 and second bridge circuit, the one being the bridge circuit in which the abnormality is detected is stopped, and the operation of the torque sensor 10 is continued by using the other of the first bridge circuit B1 and second bridge circuit B2, the other being the normal bridge circuit.

However, the abnormality processing routine is not limited to this and, when an abnormality is detected in S1, both the first bridge circuit B1 and second bridge circuit B2 may immediately be stopped, and it may be displayed on the display device 21 that an abnormality has occurred in the torque sensor 10.

According to the first embodiment described above, the torque sensor 10 is provided with the first bridge circuit B1 and second bridge circuit B2 and, when the difference (absolute value thereof) between the output voltage of the first bridge circuit B1 and output voltage of the second bridge circuit B2 is greater than the first threshold voltage, it is determined that an abnormality has occurred in one of the first bridge circuit B1 and second bridge circuit B2. Accordingly, it is possible to detect an abnormality of the torque sensor 10 before both the first bridge circuit B1 and second bridge circuit B2 go out of order. Therefore, the torque sensor 10 has a fail-safe function, and it is possible to prevent beforehand a robot arm equipped with the torque sensor 10 from causing a collision or the like.

Further, when an abnormality has occurred in the first bridge circuit B1 or in the second bridge circuit B2, it is possible to identify and stop the bridge circuit in which the abnormality has occurred, and continue the operation by using the normal bridge circuit. Accordingly, it is possible to make the torque sensor 10 continue to operate by using the normal bridge circuit, and carry out control or the like to stop the robot arm after moving the robot arm to, for example, a safe position.

Second Embodiment

In the first embodiment, both the first bridge circuit B1 and second bridge circuit B2 are provided on the third structures 13a and 13c. That is, the first bridge circuit B1 and second bridge circuit B2 are arranged in parallel with each other.

Figure 4:
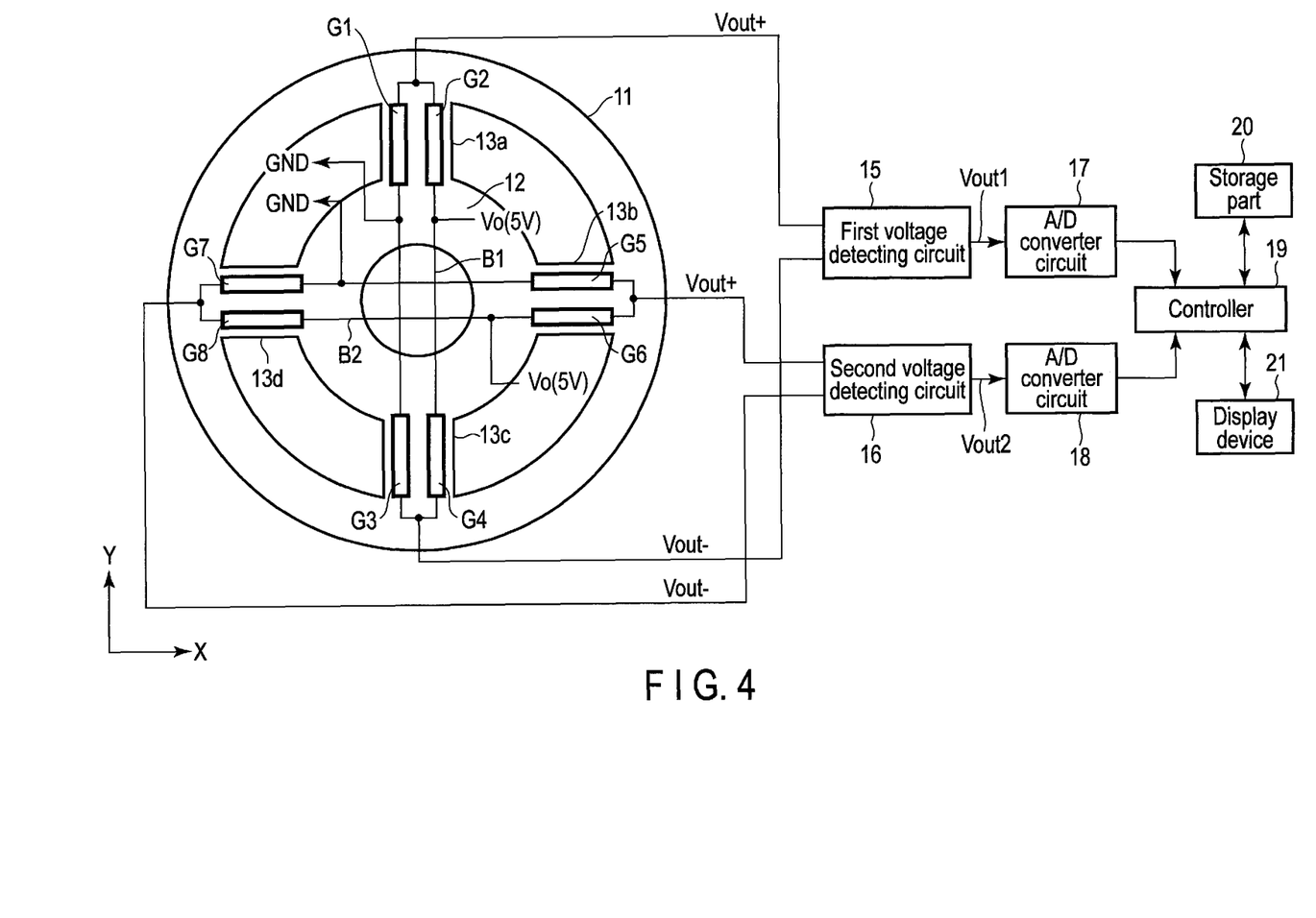
FIG. 4 is a block diagram showing an example of a torque sensor according to a second embodiment.

Conversely, in a second embodiment, a first bridge circuit B1 and second bridge circuit B2 are arranged in such a manner that the first bridge circuit B1 and second bridge circuit B2 intersect each other.

FIG. 4 shows an example of the second embodiment.

As shown in FIG. 4, a first strain sensor G1 and second strain sensor G2 of the first bridge circuit B1 are arranged on a third structure 13a, and third strain sensor G3 and fourth strain sensor G4 of the first bridge circuit B1 are arranged on a third structure 13c.

Further, a fifth strain sensor G5 and sixth strain sensor G6 of the second bridge circuit B2 are arranged on a third structure 13b, and seventh strain sensor G7 and eighth strain sensor G8 of the second bridge circuit B2 are arranged on a third structure 13d.

In the second embodiment, the circuit configuration and operation are the same as the first embodiment.

It is possible to obtain, by the second embodiment too, an advantage identical to the first embodiment.

Moreover, according to the second embodiment, the first bridge circuit B1 and second bridge circuit B2 are arranged in such a manner that the first bridge circuit B1 and second bridge circuit B2 intersect each other, the first to fourth strain sensors G1 to G4 of the first bridge circuit B1 are arranged on the third structures 13a and 13c, and fifth to eighth strain sensors G5 to G8 of the second bridge circuit B2 are arranged on the third structures 13b and 13d other than the third structures 13a and 13c. Accordingly, it is possible to reduce the probability that both the first bridge circuit B1 and second bridge circuit B2 simultaneously go out of order.

Third Embodiment

In the first and second embodiments, the abnormality of the first bridge circuit B1 or second bridge circuit B2 is detected on the basis of a digital signal. However, detection of the abnormality is not limited to this, and it is also possible to detect an abnormality of the first bridge circuit B1 or second bridge circuit B2 on the basis of an analog signal.

Figure 5:
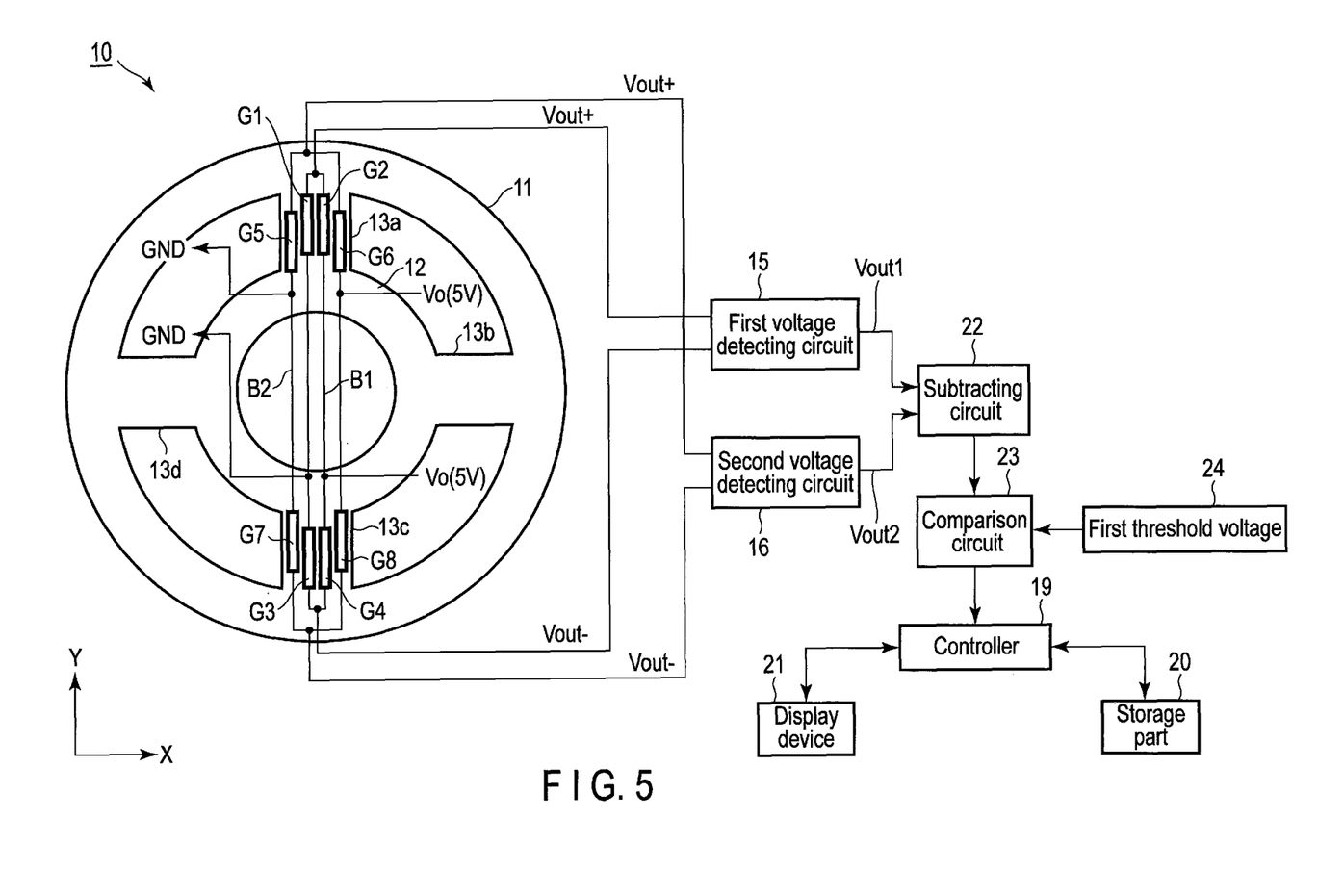
FIG. 5 is a block diagram showing an example of a torque sensor according to a third embodiment.

FIG. 5 shows an example of a third embodiment.

In the third embodiment, although the arrangement of the first bridge circuit B1 and second bridge circuit B2 is done in the same manner as the first embodiment, i.e., the first bridge circuit B1 and second bridge circuit B2 are arranged in parallel with each other, the first bridge circuit B1 and second bridge circuit B2 may be arranged in the same manner as the second embodiment, i.e., the first bridge circuit B1 and second bridge circuit B2 may be arranged in such a manner that the first bridge circuit B1 and second bridge circuit B2 intersect each other.

Output voltages Vout+ and Vout− of the first bridge circuit B1 are supplied to a first voltage detecting circuit 15, and output voltages Vout+ and Vout− of the second bridge circuit B2 are supplied to a second voltage detecting circuit 16. An output voltage Vout1 of the first voltage detecting circuit 15 and output voltage Vout2 of the second voltage detecting circuit 16 are supplied to a subtracting circuit 22. The subtracting circuit 22 outputs a voltage of a difference between the output voltage Vout1 of the first voltage detecting circuit 15 and output voltage Vout2 of the second voltage detecting circuit 16. An output voltage of the subtracting circuit 22 and first threshold voltage 24 are supplied to a comparison circuit 23. The comparison circuit 23 compares the output voltage of the subtracting circuit 22 and first threshold voltage 24 with each other. A comparison result of the comparison circuit 23 is supplied to a controller 19. When the comparison result of the comparison circuit 23 indicates an abnormality, the controller 19 stops power supply to, for example, the first bridge circuit B1 and second bridge circuit B2, and stops, for example, the operation of the robot arm. Alternatively, as in the case of the first embodiment, the controller 19 may also be configured to detect one of the first bridge circuit B1 and second bridge circuit B2, the one being the bridge circuit having an abnormality.

It is possible to obtain, by the third embodiment too, an advantage identical to the second embodiment. Moreover, by carrying out processing on the basis of an analog signal, it is possible to enhance the processing speed.

In addition, the present invention is not limited to the above embodiments as it is, and at the implementation stage, the constituent elements can be modified and embodied without departing from the scope of the invention. In addition, various inventions can be formed by appropriate combinations of a plurality of constituent elements disclosed in the above embodiments. For example, some components may be deleted from all the components shown in the embodiment. Furthermore, components in different embodiments may be combined as appropriate.

What is claimed is:

1. A torque sensor comprising:
    a first structure to be coupled to an object to be measured;
    a second structure;
    a first bridge circuit including a plurality of first strain sensors configured to detect force to be transmitted between the first structure and the second structure;
    a second bridge circuit including a plurality of second strain sensors configured to detect force to be transmitted between the first structure and the second structure;
    a controller configured to output a signal indicating an abnormality when a difference between a first output voltage of the first bridge circuit and a second output voltage of the second bridge circuit is greater than a first threshold voltage; and
    a plurality of screws configured to fix metallic plates to third structures provided between the first structure and the second structure, wherein the plurality of first strain sensors and the plurality of second strain sensors are provided on each of the metallic plates.

2. The torque sensor of claim 1, wherein
after outputting the signal, the controller selects an output voltage less than a second threshold voltage from the first output voltage of the first bridge circuit and the second output voltage of the second bridge circuit.

3. The torque sensor of claim 1, wherein
the first strain sensors included in the first bridge circuit and the second strain sensors included in the second bridge circuit are arranged in parallel with each other.

4. The torque sensor of claim 1, wherein
the first strain sensors included in the first bridge circuit and the second strain sensors included in the second bridge circuit are arranged in directions perpendicular to each other.

5. The torque sensor of claim 1, further comprising:
a first detecting circuit configured to detect the first output voltage of the first bridge circuit; and
a second detecting circuit configured to detect the second output voltage of the second bridge circuit.

6. The torque sensor of claim 5, further comprising a memory configured to store the first output voltage and the second output voltage.

7. A torque sensor comprising:
a first structure to be coupled to an object to be measured;
a second structure;
a first bridge circuit including a plurality of first strain sensors configured to detect force to be transmitted between the first structure and the second structure;
a second bridge circuit including a plurality of second strain sensors configured to detect force to be transmitted between the first structure and the second structure; and
a controller configured to output a signal indicating an abnormality when a difference between a first output voltage of the first bridge circuit and a second output voltage of the second bridge circuit is greater than a first threshold voltage,
a first detecting circuit configured to detect the first output voltage of the first bridge circuit; and
a second detecting circuit configured to detect the second output voltage of the second bridge circuit; and
a memory configured to store the first output voltage and the second output voltage;
wherein:
the controller stops the first bridge circuit when a difference between the first output voltage supplied from the first detecting circuit and the first output voltage stored in the memory is greater than the second threshold voltage, and stops the second bridge circuit when a difference between the second output voltage supplied from the second detecting circuit and the second output voltage stored in the memory is greater than the second threshold voltage.

8. The torque sensor of claim 7, wherein
after outputting the signal, the controller selects an output voltage less than a second threshold voltage from the first output voltage of the first bridge circuit and the second output voltage of the second bridge circuit.

9. The torque sensor of claim 7, wherein
the first strain sensors included in the first bridge circuit and the second strain sensors included in the second bridge circuit are arranged in parallel with each other.

10. The torque sensor of claim 7, wherein
the first strain sensors included in the first bridge circuit and the second strain sensors included in the second bridge circuit are arranged intersect each other.

11. The torque sensor of claim 7, further comprising:
a first detecting circuit configured to detect the first output voltage of the first bridge circuit; and
a second detecting circuit configured to detect the second output voltage of the second bridge circuit.

12. The torque sensor of claim 11, further comprising a memory configured to store the first output voltage and the second output voltage.

* * * * *